(12) United States Patent
Park et al.

(10) Patent No.: US 7,146,200 B2
(45) Date of Patent: Dec. 5, 2006

(54) CAMERA LENS MOUNTING DEVICE OF FOLDER TYPE TELEPHONE

(75) Inventors: Chun-Kyu Park, Kyongsangbuk-do (KR); Jong-Gun Bae, Kumi-shi (KR); Jin-Woo Kim, Kumi-shi (KR)

(73) Assignee: Samsung Electronics Co., Ltd. (KR)

( * ) Notice: Subject to any disclaimer, the term of this patent is extended or adjusted under 35 U.S.C. 154(b) by 516 days.

(21) Appl. No.: 10/314,935

(22) Filed: Dec. 9, 2002

(65) Prior Publication Data

US 2003/0109232 A1 Jun. 12, 2003

(30) Foreign Application Priority Data

Dec. 8, 2001 (KR) ................................ 2001-77653

(51) Int. Cl.
*H04M 1/00* (2006.01)
*H04B 1/38* (2006.01)

(52) U.S. Cl. .................................. 455/575.3; 455/90.3

(58) Field of Classification Search ............. 455/575.1, 455/575.3, 550.1, 347; 379/433.13, 433.01, 379/433.05; 348/207.99, 151, 373; 361/730; 16/356, 319, 355; 359/826

See application file for complete search history.

(56) References Cited

U.S. PATENT DOCUMENTS

| | | | | |
|---|---|---|---|---|
| 4,862,199 | A * | 8/1989 | Centkowski et al. | 396/19 |
| 5,491,507 | A * | 2/1996 | Umezawa et al. | 348/14.02 |
| 6,295,358 | B1 * | 9/2001 | Kubota | 379/433.13 |
| 6,704,586 | B1 * | 3/2004 | Park | 455/575.3 |
| 2001/0015861 | A1 * | 8/2001 | Sasaki | 359/826 |
| 2002/0039890 | A1 * | 4/2002 | Kim | 455/90 |

* cited by examiner

*Primary Examiner*—Quochien B. Vuong
*Assistant Examiner*—Dominic E. Rego
(74) *Attorney, Agent, or Firm*—Dilworth & Barrese LLP

(57) ABSTRACT

A camera lens mounting device of a folder-type telephone is disclosed. In the folder-type telephone including a body housing, a folder, and hinge means for rotatably connecting the body housing to the folder, the camera lens mounting device comprises hinge arms and a guide arm, which are integrally formed on a hinge axis of the body housing, and a camera lens assembly installed between the guide arm and one of the hinge arms so that a camera lens housing rotates within a designated angle, and the camera lens housing includes a camera lens assembly, a connector, and a rotating handle grip.

12 Claims, 4 Drawing Sheets

CAMERA LENS MOUNTING DEVICE OF FOLDER TYPE TELEPHONE

PRIORITY

This application claims priority to an application entitled "CAMERA LENS MOUNTING DEVICE OF FOLDER TYPE TELEPHONE", filed in the Korean Industrial Property Office on Dec. 8, 2001 and assigned Ser. No. 2001-77653, the contents of which are hereby incorporated by reference.

BACKGROUND OF THE INVENTION

1. Field of the Invention

The present invention relates to a folder type telephone, and more particularly to a camera lens mounting device of a folder type telephone, in which the camera lens is installed on a hinge means of the folder type telephone, thereby achieving a communication and a camera function together.

2. Description of the Related Art

Typically, portable telephone terminals are divided into several types i.e., bar-type telephone terminals, flip-type telephone terminals, and folder-type telephone terminals according to their shape. Further, the portable telephone terminals may be divided into necklace types and wristlet types according to their wearing location. Moreover, the portable telephone terminals may be divided into telephone terminals for voice communication, telephone terminals for picture communication, and telephone terminals for Internet communication according to their usage. Therefore, in order to use the portable telephone terminal to achieve the picture communication and the camera function for taking a picture of a subject as well as the voice communication, a conventional camera lens assembly must be installed on the portable telephone terminal. The conventional camera lens assembly comprises a camera lens, a CCD (Charge Coupled Device), and associated circuitry for transmitting the signal of the device.

Hereinafter, the folder-type portable telephone terminal installed with the conventional camera lens assembly is described. A general folder-type portable telephone terminal comprises a body housing, a folder, and hinge means for rotatably connecting the body housing to the folder. The camera lens assembly can be installed on the body housing or the folder of the telephone terminal.

Of course, the aforementioned camera lens assembly may be installed on a body housing of the bar-type portable telephone terminal or the flip-type portable telephone terminal. Further, the camera lens assembly may be installed on a notebook computer or a PDA (Personal Digital Assistant).

Generally, the camera lens assembly is installed on a fixed element such as the body housing. Therefore, when a user picture-communicates with a counterpart using the telephone terminal provided with the camera lens assembly, the user must face the camera lens, making communication very inconvenient. Further, in order to take a picture of a desired subject, the location of the camera lens on the telephone terminal must be changed or the user must assume an inconvenient posture, thereby being troublesome to the user.

Moreover, when the portable telephone terminal provided with the camera lens assembly falls to the ground by the user's carelessness, the camera lens assembly is easily broken, because the conventional camera lens assembly installed on the telephone terminal often protrudes from the surface of the telephone terminal. This protruded configuration of the camera lens assembly on the telephone terminal is easily damaged.

SUMMARY OF THE INVENTION

Therefore, the present invention has been made in view of the above problems, and it is an object of the present invention to provide a camera lens mounting device of a folder-type portable telephone, in which a camera lens assembly is installed on a rotatable lens housing, thereby allowing convenient picture-communication with a counterpart.

It is another object of the present invention to provide a camera lens mounting device of a folder-type portable telephone, which can take a picture of a subject regardless of the opening and closing of the folder of the telephone.

In accordance with the present invention, the above and other objects can be accomplished by the provision of a camera lens mounting device of a folder-type telephone including a body housing, a folder, and hinge means for rotatably connecting the body housing to the folder, the camera lens mounting device comprising hinge arms and a guide arm, which are integrally formed on a hinge axis of the body housing, and a camera lens assembly installed between the guide arm and one of the hinge arms so that a camera lens housing rotates within a designated angle, and the camera lens housing includes the camera lens assembly, a connector, and a rotating handle grip.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
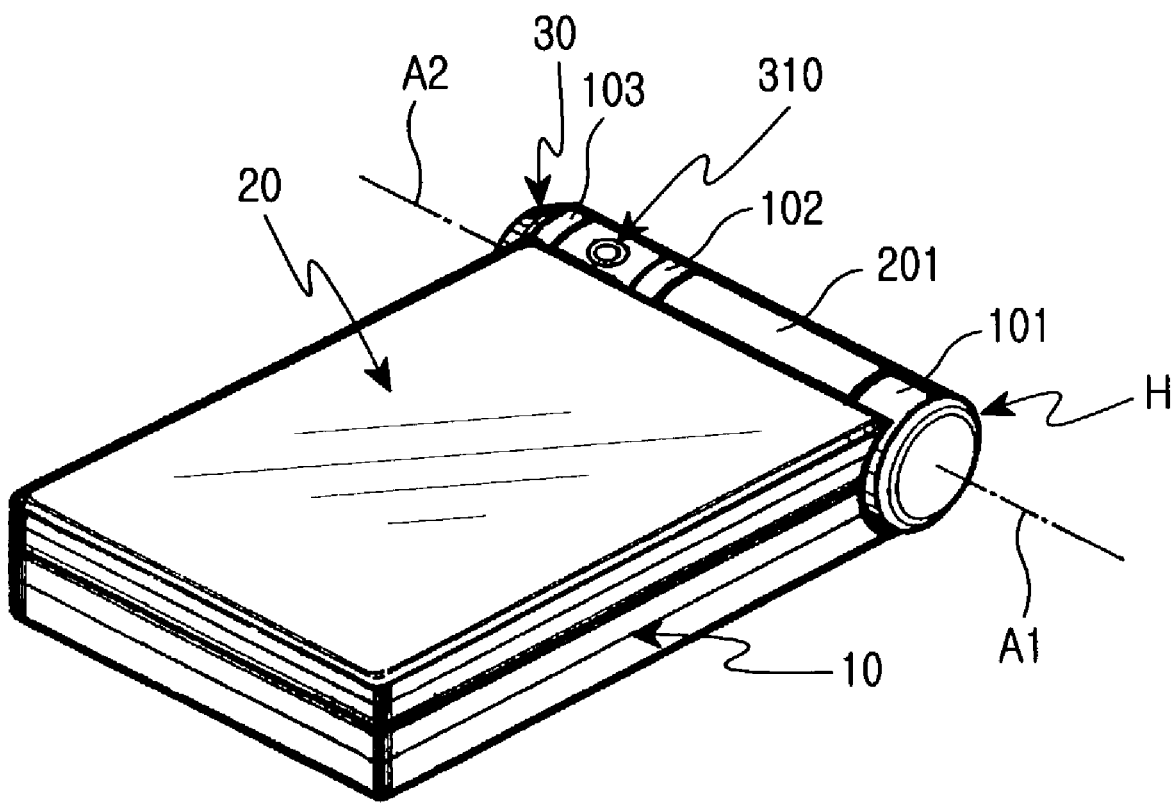
FIG. 1 is a perspective view of a folder-type telephone terminal in a closed state, in which a camera lens is installed on a camera lens housing, in accordance with one preferred embodiment of the present invention.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations is omitted to avoid making the subject matter of the present invention unclear.

Figure 2:
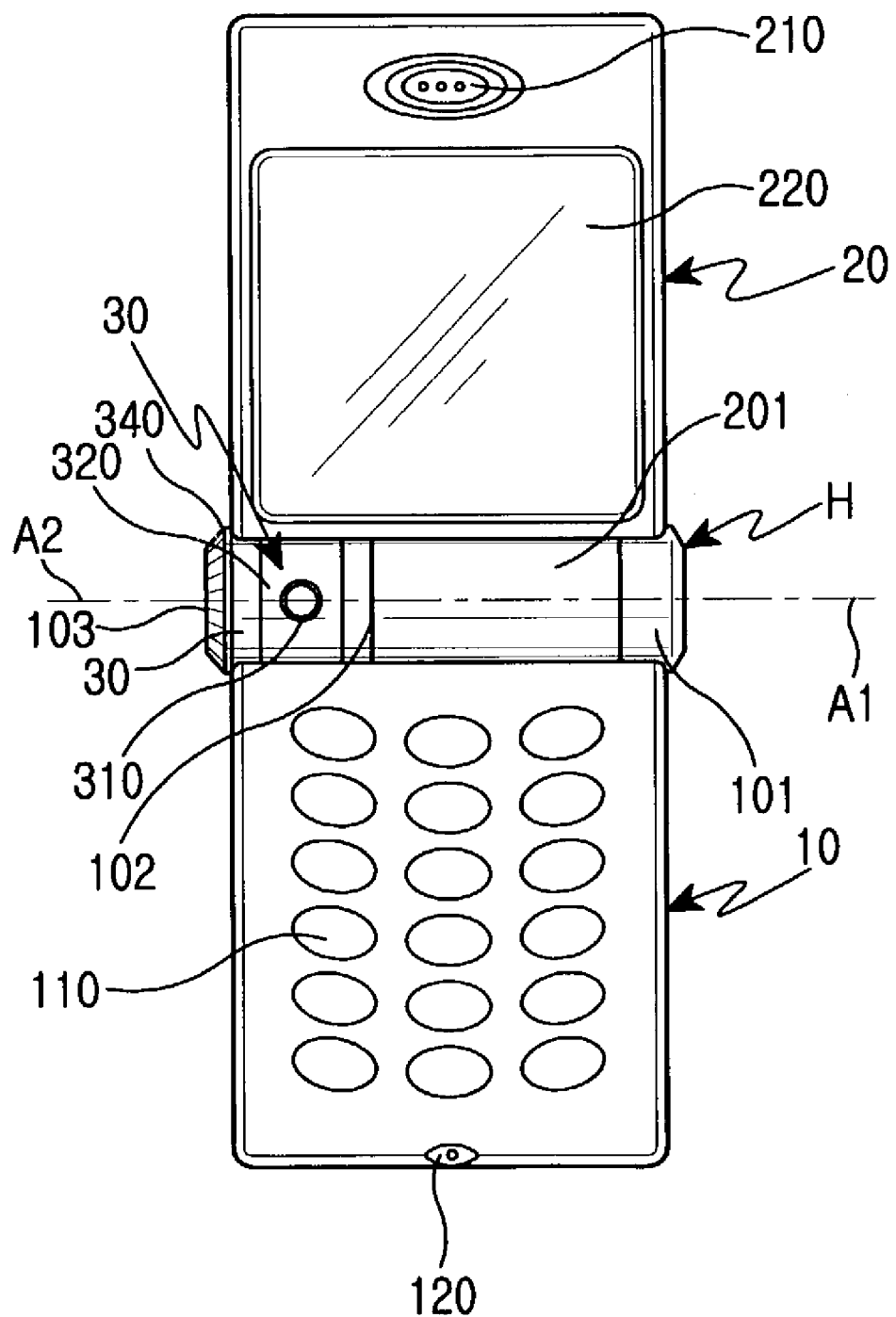
FIG. 2 is a plan view of the folder-type telephone terminal in an opened state, in which the camera lens is installed on the camera lens housing, in accordance with the preferred embodiment of the present invention.

FIG. 1 is a perspective view of a folder-type telephone terminal provided with a rotatable camera lens housing 30, in which a folder 20 of a body housing 10 is closed. FIG. 2 is a plan view of the folder-type telephone terminal provided with the camera lens housing 30, in which the folder 20 of the body housing 10 is fully opened.

As shown in FIGS. 1 and 2, the folder-type telephone terminal provided with the camera lens housing 30 in accordance with one preferred embodiment of the present invention comprises the body housing 10, the folder 20, hinge means H for rotatably connecting the body housing 10 to the folder 20, and the rotatable camera lens housing 30. A camera lens assembly 320, which is displaceable about a hinge axis A1 of the hinge means H, is installed on the rotatable camera lens housing 30. The camera lens assembly 320 serves to picture-communicate and/or to take a picture of a subject. The rotatable camera lens housing 30 rotates on an axis A2 within a designated angle. Herein, the hinge axis A1 of the hinge means H and the rotational axis A2 of the rotatable camera lens housing 30 are coaxial.

The body housing 10 comprises a plurality of key buttons 110 for inputting data by a pressing action and a microphone means 120. The folder 20 comprises a LCD (Liquid Crystal Display) 220 for displaying the inputted data, and an earpiece 210. The key buttons 110 include character keys, number keys, a send key, a delete key, an end key, and special function keys. The earpiece 210 includes a conventional speaker (not shown).

Centering on the hinge axis A1, the folder 20 is opened and closed from and to the body housing 10. The hinge means H comprises a first and a second side hinge arms 101 and 102, which are integrally formed on the body housing 10 and opposed to each other, a guide arm 103 for installing the rotatable camera lens housing 30 on one edge, a center hinge arm 201, which is integrally formed on the folder 20, and the camera lens housing 30, which is rotatably installed between the second side hinge arm 102 and the guide arm 103.

The center hinge arm 201, the first and the second side hinge arms 101 and 102, and the guide arm 103 installed with the camera lens housing 30 are connected along the hinge axis A1. The camera lens housing 30 is installed between the second hinge arm 102 and the guide arm 103 so that the camera lens housing 30 rotates within the designated angle. The second arm 102 and the guide arm 103 are preferably cylindrical.

Figure 3:
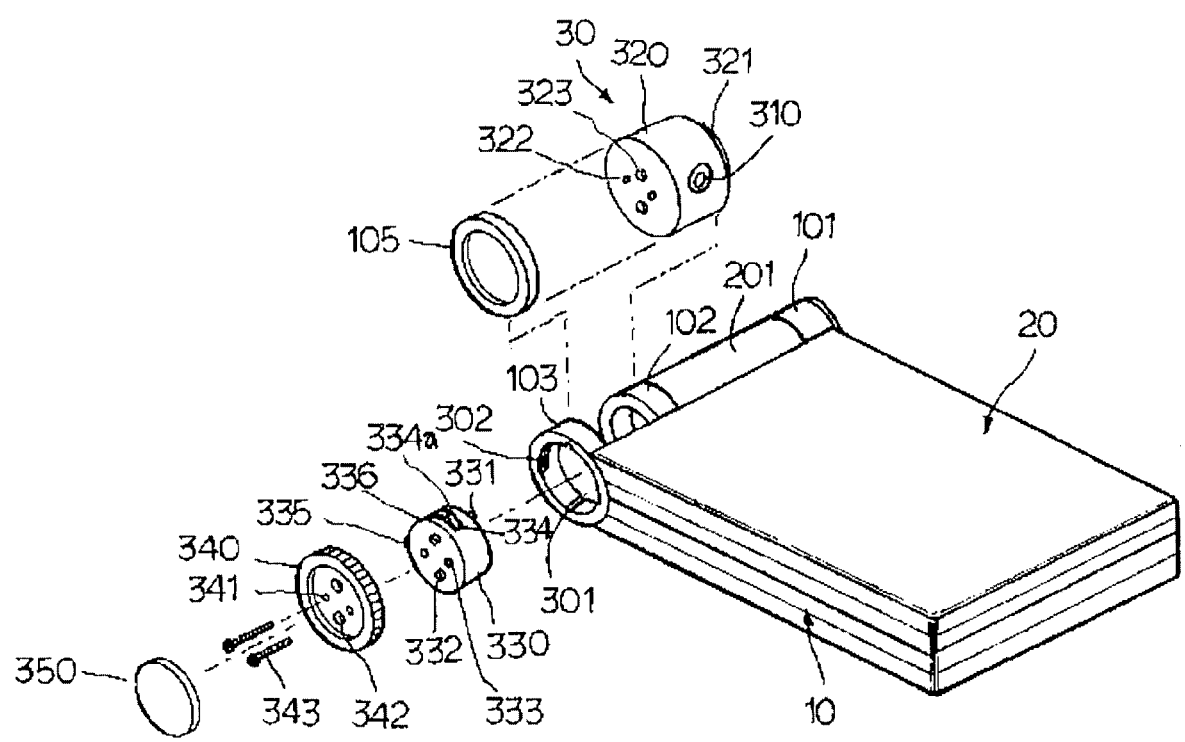
FIG. 3 is an exploded perspective view of a camera lens housing for installing a camera lens assembly, in accordance with the preferred embodiment of the present invention.
Figure 4:
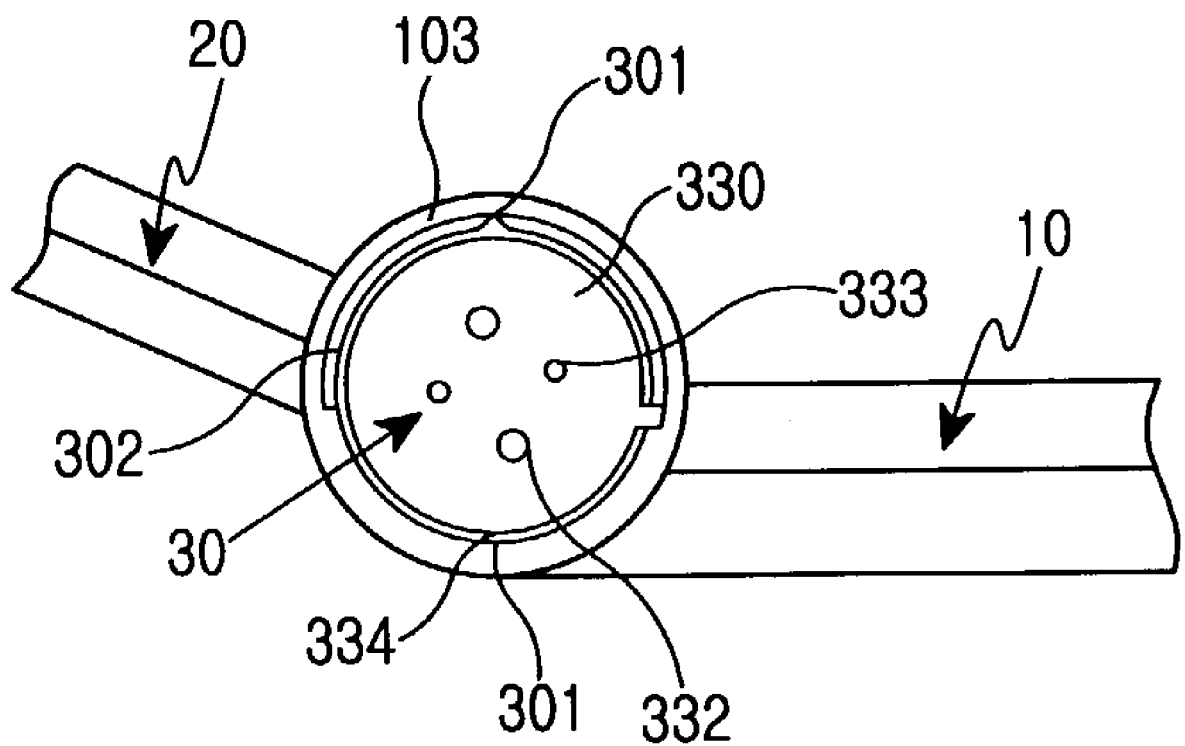
FIG. 4 is a side view showing a connection between a guide arm of a body housing and a connector of the camera lens housing without a cover.

FIG. 3 is an exploded perspective view of the camera lens housing for installing the camera lens assembly, in accordance with the preferred embodiment of the present invention, and FIG. 4 is a side view showing a connection between the guide arm of the body housing and a connector of the camera lens housing without a cover.

Hereinafter, with reference to FIGS. 3 and 4, the device for installing the camera lens housing 30 of the present invention is described in detail. As shown in FIGS. 3 and 4, the camera lens housing 30 comprises the camera lens assembly 320, a connector 330, and a rotating handle grip 340. A camera lens 310 is installed on the center of the cylindrical surface of the camera lens assembly 320. The camera lens assembly 320 comprises a circular guide rib 321 to be coupled with the second hinge arm 102, at least one screw hole 322, and at least one fixing recess 323. Herein, the guide rib 321 is formed on one side surface of the camera lens assembly 320, and the screw hole 322 and the fixing recess 323 are formed on the other side surface of the camera lens assembly 320.

The connector 330 is connected to the camera lens assembly 320 so that the connector 330 rotates at the designated angle within the guide arm 103. Herein, a dummy ring 105 is interposed between the camera lens assembly 320 and the guide arm 103. The dummy ring 105 serves to provide a cavity for enclosing a ductile circuit in assembling the circuit, thereby facilitating the assembly. At least one fixing rib is formed on at least one side surface of the connector 330 (as shown in FIG. 3, the preferred embodiment of the present invention includes two fixing ribs or tabs 331 and 332, one on each side surface of the connector 330) and at least one screw hole 333 is formed through the connector 330. The fixing ribs or tabs 331 and 332 protrudes from the surface of the connector 330. A protruded flat spring 334 is formed on the center of the cylindrical surface of the connector 330. Further, a stopper 335 is formed on the cylindrical surface of the connector 330. The stopper 335 serves to prevent the connector 330 from rotating more than the designated angle, i.e. 180 degrees.

The rotating handle grip 340 comprises at least one fixing rib or tab hole 341 and at least one screw hole 342. Herein, a screw 343 is inserted into the screw hole 342. Preferably, the connector 330 of the camera lens housing 30 comprises two fixing ribs or tabs 331 and 332, and two screw holes 333.

The camera lens assembly 320 is installed between the second hinge arm 102 and the guide arm 103 of the body housing 10 so that the entire camera lens housing 30 rotates. The guide rib 321, which is formed on one side surface of the camera lens assembly 320 of the camera lens housing 30, is inserted into the second hinge arm 102. The connector 330 is inserted into the guide arm 103 so that the fixing rib or tab 331 formed on one side surface of the connector 330 is inserted into the fixing recess 323 formed on the other side surface of the camera lens assembly 320. Herein, the flat spring 334 of the connector 330 is adhered closely to the inner wall of the guide arm 103. The stopper 335 of the connector 330 is located on one of plural location fixing recesses 301 formed on the inner wall of the guide arm 103 so that the connector 330 stops its rotation at a desired position.

Alternatively, the stopper 335 of the connector 330 is located on a guide groove 302 with a designated length, which is formed on the inner wall of the guide arm 103, so that the stopper 335 moves along the guide groove 302, thereby rotating the connector 330 within the designated angle.

The fixing rib or tab 332 formed on the other surface of the connector 330 is inserted into the fixing rib hole 341 of the rotating handle grip 340. The rotating handle grip 340 is integrated with the camera lens assembly 320 by inserting the screw 343 into the screw hole 322 of the camera lens assembly 320 through the screw hole 342 of the rotating handle grip 340 and the screw hole 333 of the connector 330. After inserting the screw 343 into screw hole 322 of the camera lens assembly 320 through the rotating handle grip 340, a cover 350 is attached to the rotating handle grip 340.

Herein, FIG. 4 does not show the cover 350.

A cavity for enclosing the ductile circuit is formed on one side surface of the camera lens assembly 320.

As shown in FIG. 3, a guide slot 336 is formed on the center of the cylindrical surface of the connector 330. The flat spring 334 is mounted on the guide slot 336 of the connector 330. The flat spring 334 includes a protruded tension part 334a. The tension part 334a of the flat spring 334 contacts the inner wall of the guide arm 103 and is inserted into the location fixing recess 301 of the guide arm 103. Thereby, when the connector 330 stops at the desired position, the camera lens housing 30 stops its rotation, thereby fixing the camera lens housing 30.

The camera lens assembly 320 comprises the camera lens 310, a CCD (Charge Coupled Device) formed under the camera lens 310, and the ductile circuit connected to the CCD. The camera lens assembly 320 is electrically connected to a main printed circuit board, which is installed on the body housing 10. Therefore, a slim connector (not shown) formed on a ductile circuit terminal of the camera lens 310 of the camera lens housing 30 is connected to the main printed circuit board by passing through the second side hinge arm 102.

In the above-described folder-type portable telephone terminal, the folder 20 is opened and closed from and to the body housing 10. When the camera lens 310 of the camera lens housing 30 installed on the hinge axis turns inward, the telephone terminal can be used as a portable telephone terminal for picture communication. When a user rotates the rotating handle grip 340, the connector 330 and the camera lens assembly 320 rotate together, thereby rotating the camera lens 310 up to 180 degrees. Then, the camera lens 310 changes its direction and can be used as a camera phone for taking a picture. Herein, the stopper 335, which is formed on the cylindrical surface of the connector 330, is engaged with one end of the guide groove 302, thereby stopping the rotation of the connector 330. The protruded tension part 334a of the flat spring 334, which is formed on the cylindrical surface of the connector 330, is guided and rotates along the inner wall of the guide arm 103. Then, the protruded tension part 334a of the flat spring 334 is inserted into the location fixing recess 301, thereby fixing the connector 330. In such a manner, the camera lens housing 30 is fixed to the body housing 10.

In rotating the camera lens assembly 320 by the manipulation of the rotating handle grip 340, the stopper 335 of the connector 330 prevents the camera lens assembly 320 from rotating more than 180 degrees, thereby preventing the ductile circuit from being damaged from twisting or wrenching. The flat spring 334, which is positioned between the guide arm 103 of the camera lens housing 30 and the connector 330, prevents the camera lens assembly 320 from trembling or shaking, thereby firmly fixing the camera lens assembly 320.

As described above, the rotatable camera lens housing of the present invention is rotatably installed on the hinge of the folder-type portable telephone terminal. Therefore, the user can conveniently picture-communicate using this telephone. Further, the rotatable camera lens housing of the present invention is not limited to the folder-type telephone terminal, but may be applied to all folder-type communication devices.

As apparent from the above description, according to the present invention, the camera lens assembly is installed on the hinge means of the folder-type portable telephone so that the camera lens housing freely rotates within a designated angle, such as an angle up to 180 degrees. Therefore, the folder-type portable telephone provided with the camera lens housing of the present invention can be used as a picture-communication telephone or camera phone.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A camera lens mounting device of a folder-type telephone including a body housing, a folder, and hinge means for rotatably connecting the body housing to the folder, said device comprising:
    hinge arms and a guide arm, which are integrally formed on a hinge axis of the body housing; and
    a camera lens assembly installed between said guide arm and one of said hinge arms so that a camera lens housing rotates within a designated angle, and the camera lens housing includes the camera lens assembly, a connector, and a rotating handle grip.

2. The camera lens mounting device of the folder-type telephone as set forth in claim 1, wherein said camera lens assembly comprises:
    a circular guide rib to be coupled with the hinge arm formed on its one side surface; and
    at least one screw hole and at least one fixing recess, said screw hole and said fixing recess formed on its other side surface.

3. The camera lens mounting device of the folder-type telephone as set forth in claim 1, wherein said connector comprises:
    at least one protruding fixing rib formed on each of its side surfaces and rotating at the designated angle within the guide arm, thereby coupling one side surface with the rotating handle grip and coupling an other side surface with the camera lens assembly;
    at least one screw hole formed through the connector;
    a flat spring formed on the center of its cylindrical surface and protruding from the surface; and
    a stopper formed on an other area of the cylindrical surface in order to prevent the connector from rotating more than the designated angle.

4. The camera lens mounting device of the folder-type telephone as set forth in claim 1, wherein the designated angle is 180 degrees.

5. The camera lens mounting device of the folder-type telephone as set forth in claim 1, wherein said rotating handle grip comprises:
    at least one fixing rib hole; and
    at least one screw hole for inserting a screw.

6. The camera lens mounting device of the folder-type telephone as set forth in claim 3, wherein the flat spring is inserted into a guide slot formed on the center of the cylindrical surface of the connector and includes a tension part with a protruded center area, and the tension part of the flat spring contacts an inner wall of the guide arm and is inserted into a location fixing recess of the guide arm, thereby stopping the connector at a desired position.

7. The camera lens mounting device of the folder-type telephone as set forth in claim 2, wherein the camera lens housing integrates the camera lens assembly and the connector by inserting a screw into the screw hole of the camera lens assembly through a screw hole of the connector.

8. The camera lens mounting device of the folder-type telephone as set forth in claim 1, wherein a dummy ring is interposed between the camera lens housing and the guide arm.

9. A camera lens mounting device of a folder-type telephone including a body housing and a folder, said device comprising:
    a first and a second side hinge arms and a guide arm, which are integrally formed on the body housing;
    a center hinge arm, which is integrally formed on the folder between the first and the second side hinge arms;
    a rotatable camera lens housing, which includes a connector, a rotating handle grip and a camera lens assembly, which is installed between the second side hinge arm and the guide arm;
    plural location fixing recesses formed on an inner wall of the guide arm so that the rotatable camera lens housing can be fixed at a desired position within a designated angle of rotation;

a guide groove formed on the inner wall of the guide arm in a circumferential direction; and a guide rib formed on one side surface of the camera lens assembly of the camera lens housing, wherein the guide rib is interposed between the second side hinge arm and the guide arm, the connector is inserted into the guide arm so that a tension part of a flat spring formed on the center of the cylindrical surface of the connector is located on one of the plural location fixing recesses and a stopper of the connector is positioned within the guide groove, and the rotating handle grip is integrated with the camera lens assembly by inserting a screw via the connector.

10. The camera lens mounting device of a folder-type telephone as set forth in claim 9, wherein said connector comprises:

at least one protruding fixing rib formed on its both side surfaces and rotating at a designated angle within the guide arm;

at least one screw hole formed through the connector;

the flat spring formed on the center of its cylindrical surface and protruding from the surface; and the stopper formed on an other area of the cylindrical surface in order to prevent the connector from rotating more than the designated angle.

11. The camera lens mounting device of the folder-type telephone as set forth in claim 10, wherein the designated angle is 180 degrees.

12. A camera lens mounting device for rotatably connecting a body housing to a folder via a hinge assembly, said device comprising:

a camera lens assembly positioned between a hinge arm and a guide arm, wherein the hinge and guide arms are fixedly attached to the body housing; and a camera lens housing which includes the camera lens assembly, a connector, and a rotating handle grip, wherein operation of the rotating handle grip rotates the camera lens housing independent of the body housing and of the folder.

* * * * *